Figure 1:
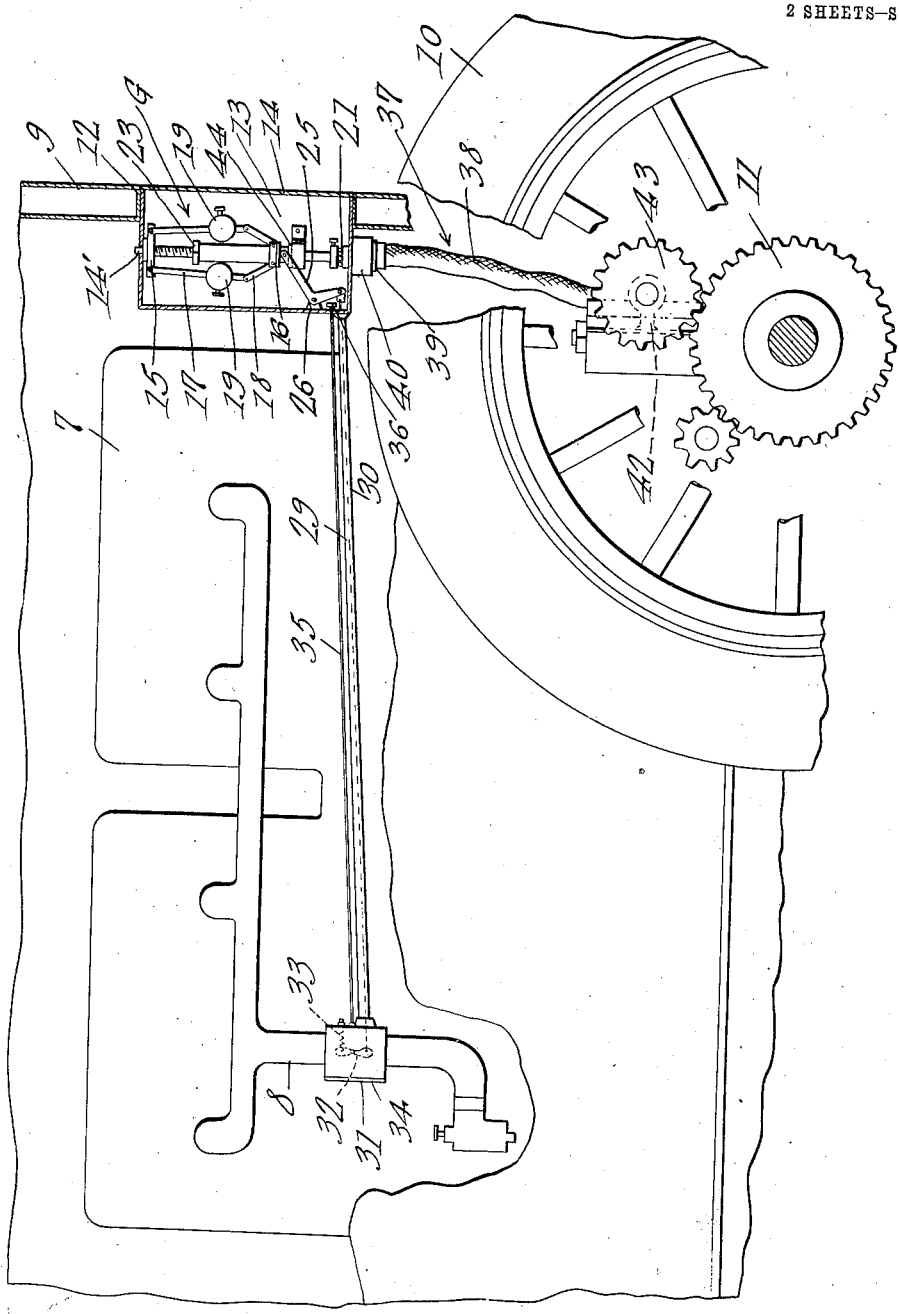

T. W. HENDERSON.
SPEED CONTROLLING MECHANISM FOR AUTOMOBILES.
APPLICATION FILED MAY 22, 1914.

1,112,137.

Patented Sept. 29, 1914.
2 SHEETS—SHEET 1.

Witnesses

T. W. Henderson
Inventor
by
Attorneys

T. W. HENDERSON.
SPEED CONTROLLING MECHANISM FOR AUTOMOBILES.
APPLICATION FILED MAY 22, 1914.
1,112,137.
Patented Sept. 29, 1914.
2 SHEETS—SHEET 2.
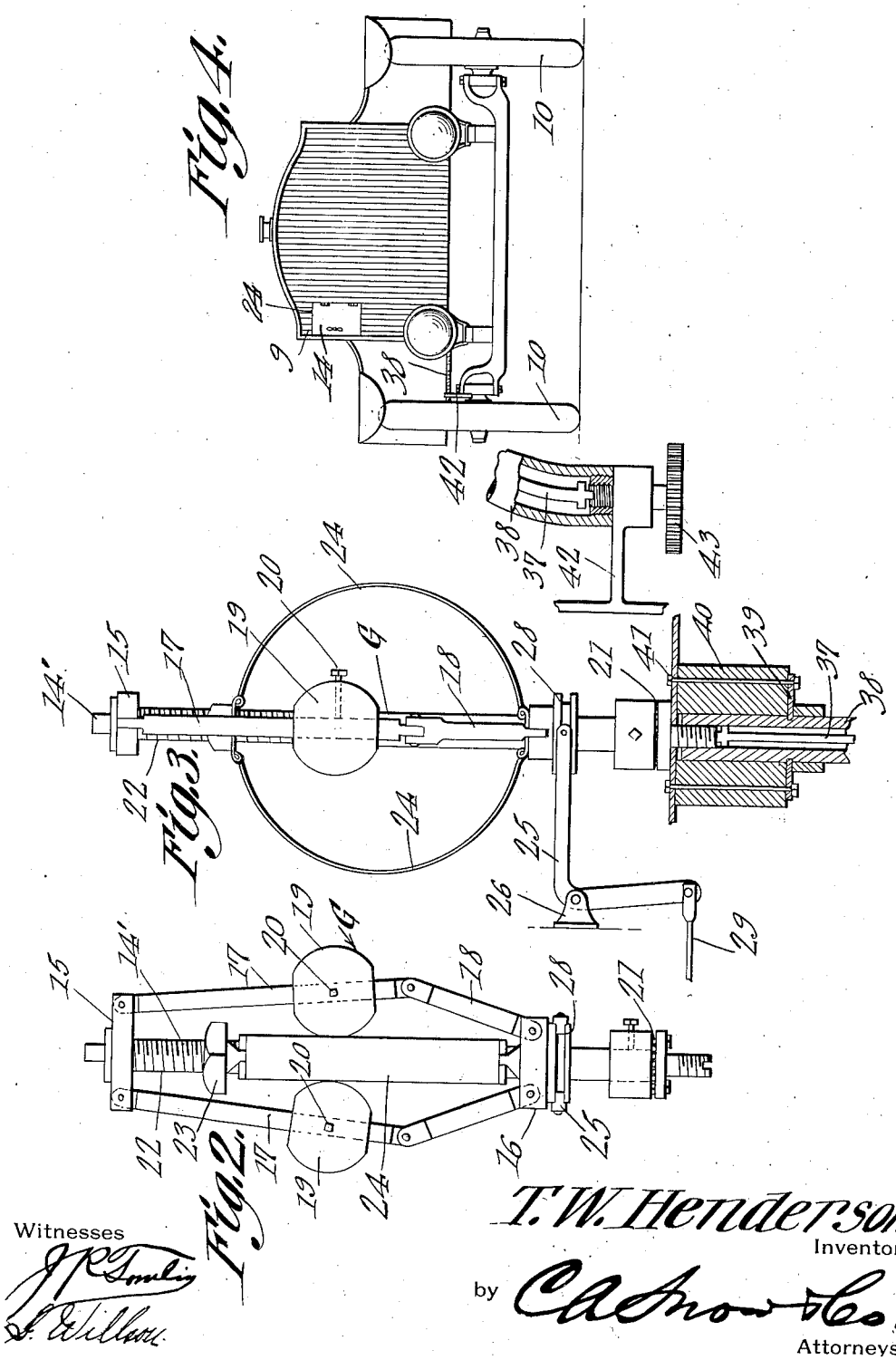

UNITED STATES PATENT OFFICE.

THOMAS W. HENDERSON, OF FORT MADISON, IOWA.

SPEED-CONTROLLING MECHANISM FOR AUTOMOBILES.

1,112,137.　　　　Specification of Letters Patent.　　Patented Sept. 29, 1914.

Application filed May 22, 1914. Serial No. 840,283.

*To all whom it may concern:*

Be it known that I, THOMAS W. HENDERSON, a citizen of the United States, residing at Fort Madison, in the county of Lee and State of Iowa, have invented a new and useful Speed-Controlling Mechanism for Automobiles, of which the following is a specification.

This invention relates to a mechanism for controlling the speed of automobiles.

An object of the present invention is to provide a mechanism which will automatically prevent an automobile from exceeding a certain predetermined speed.

A further object is to provide a mechanism which can be adjusted so that a valve will be closed in the intake pipe of an engine when the vehicle attains a certain predetermined speed. The point at which the automatic closing of the valve takes place can be set according to the speed laws and assurance will then be had that the speed of the vehicle will never exceed the speed permitted by law.

Another object is to provide a speed controlling mechanism for vehicles which can be locked in a closed position, preventing the malicious or unauthorized running of the vehicle.

A further object is to provide a vehicle with the aforementioned mechanism so arranged as to be easily accessible, allowing adjustments to be conveniently made, thus rendering the mechanism eminently practical, resulting in its continuous and permanent use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is illustrated, in which :—

Figure 1 is a fragmental view of the front portion of an automobile with my improved speed regulating mechanism operably connected thereto. Fig. 2 is a detail view in elevation of the governor and allied parts. Fig. 3 is a similar representation with the viewpoint shifted through 90 degrees. Fig. 4 is a detail view, partially in section, of the governor drive.

Referring to the drawings in which similar reference numerals designate corresponding parts throughout the several views, 7 generally designates an internal combustion engine which includes an inlet manifold or pipe 8. A radiator 9 is fragmentally illustrated in Fig. 1, which remark also applies to the front wheel 10. The front wheel has the usual speedometer driving gear 11 from which motion is derived for driving the governor of the regulating mechanism. The radiator 9 is provided with the chamber or opening 12 in which is placed the governor box 13. The front door 14 of the said governor box or casing opens outwardly so as to render the mechanism disposed therein readily and easily accessible without necessitating the raising of the hood. A governor G is situated within the box or casing 13 and includes a shaft 14', to the upper extremity of which is rigidly secured the cross beam 15. A lower cross beam 16 is slidably mounted upon the shaft and pivotally secured to the said cross beams are the ball carrying arms 17 and connecting links 18. A pair of governor balls 19 are slidably mounted upon the arms 17 and adjustably held in position by the set screws 20. The shaft 14' is journaled within suitable bearings, preferably ball bearings 21, which are carried by the casing 13. The shaft is threaded as at 22, and upon which is disposed the spring adjusting nut 23, the latter moving into forced contact with the bow-shaped spring 24 which extends between the said nut and the lower sliding cross beam 16.

A bell crank lever 25 is fulcrumed to a bracket 26 and rotatably engages a grooved member or sleeve 28 which is carried by the lower cross beam 16. Thus, as the lower cross beam is raised, the bell crank lever 25 is shifted, which motion is imparted to the connecting rod 29. The connecting rod 29, as illustrated in Fig. 1, extends through a tube 30 from the governor casing 13 to the fuel controlling valve 31. The fuel controlling valve 31 may be of any conventional type and includes the arm 32 to which the resilient spring 33 is connected and to which the connecting rod 29 is pivotally secured. Thus, as the connecting rod is moved forwardly by the raising of the lower cross beam, the fuel controlling valve 31 will be closed or partly closed, cutting off or limiting the supply of fuel to the engine. The fuel controlling valve 31 is provided with the door 34, rendering the interior thereof accessible and in order to prevent the same from being moved open, either accidentally or maliciously, the tie rod 35 is provided, secured thereto, and projects through the casing 13, at which point the wing nut 36 is provided. This nut being disposed within the casing 13 cannot be reached unless the door 14 is first opened. The rod 35 also tends to brace the casing 13 as will be readily appreciated.

In order to transmit motion from the front wheel 10 to the governor shaft 14′, a flexible driving shaft 37 is provided, the same including an outer casing 38 and an inner driving member 39. The flexible driving shaft is connected to the shaft 14′ as illustrated in detail in Fig. 3, in which the flexible casing 37 is held in position by a locking washer 39. This locking washer is in turn held to the bolted block or bearing 40 which projects beneath the box or casing 13. Inasmuch as the nuts 41 whereby the bearing or block 40 is held in position are disposed within the casing they are also rendered inaccessible unless the front door of the casing is first opened. A bearing member 42 rotatably receives the lower extremity of the flexible shaft and also rotatably mounts the gear 43 which meshes with and is driven by the gear 11. In this manner, the rotation of the front wheel 10 will produce a rotation of the governor G with the consequential elevation or depression of the lower cross beam 16, according to the speed of rotation of the shaft.

Disposed within the casing 13 as illustrated in Fig. 1, is the hinged plate 44 which is so arranged that the hinged portion may swing beneath the lower cross beam 16 and into contact with the shaft 14′. The plate is hingedly mounted at such height that when disposed beneath and holding the cross beam in an elevated position, the fuel regulating valve 31 will be completely closed, thus preventing the starting or running of the engine. The desirable feature of the foregoing resides in the fact that when it is desired to leave the car for some little time, the front door 14 is opened and the hinged plate 44 swung beneath the lower cross beam 16, which, it is to be noted, has been previously raised, allowing such action to take place. This closes the fuel controlling valve and until such time as the hinged plate is removed from such position, will prevent the car or automobile from being used.

The balls 19 may be adjusted along the arms 17, thus changing the speed at which the fuel valve will be closed. For a similar reason, the shaft 14′ is threaded and the spring adjusting nut 23 secured thereon. This allows the compressive force of the bowed spring 24 to be adjusted as desired. The shaft 14′ may be graduated or the arms 17 may be so marked that the governor is adjusted so that the speed of the car will never exceed the allowable speed as determined by law. Thus with the governor so set, the driver can proceed with the assurance that he is not breaking any speed regulations and therefore does not have to be constantly watching the speedometer, but may proceed with safety at a speed closely approximating the maximum allowable velocity.

Having thus fully described my invention, what I claim is:—

1. The combination with a vehicle with a radiator and fuel supply, of a casing built in the radiator thereof and provided with an outwardly opening door, and speed controlled means disposed within said casing, adapted to close the fuel supply at excessive vehicle speeds.

2. The combination with a vehicle with a radiator and fuel controlling valve, of a casing built in the radiator thereof and provided with an outwardly opening door, and speed controlled means disposed within said casing for closing the fuel controlling valve at excessive speeds, said adjustable means for regulating the speed necessary for the closure of the fuel controlling valve.

3. A speed controlling mechanism for automobiles with radiators, comprising a governor casing built in the vehicle radiator, a door opening outwardly therefrom, a governor disposed within said casing, means operably connecting said governor with a vehicle wheel, a fuel controlling valve disposed within the inlet manifold of the vehicle engine, a housing tube extending between said governor casing and fuel controlling valve, and a connecting rod disposed within said housing tube operably connecting said governor with said fuel controlling valve for the actuation of the latter by and with the former.

4. The combination with a vehicle having a radiator, of a casing built in said radiator, the interior of said casing accessible from the front of said radiator, a speed controlling mechanism disposed within said casing, means mechanically connecting the same to a wheel of the vehicle, and means mechanically connecting the speed controlling means with the automobile driving mechanism for controlling the speed thereof.

5. The combination with an automobile with a hood and driving means interposed therein, of a casing disposed within said hood and externally accessible with respect thereto, adjustable speed controlling means disposed within said casing and mechanically connected to said automobile, said speed controlling means mechanically connected to said automobile driving means for controlling the speed thereof.

6. The combination with an automobile with a hood and driving means interposed therein, of a casing disposed within said hood and externally accessible with respect thereto, adjustable speed controlling means disposed within said casing and mechanically connected to said automobile, said speed controlling means mechanically connected to said automobile driving means for controlling the speed thereof, and means disposed within said casing adapted to lock said speed controlling means out of operable position.

In testimony that I claim the foregoing as my own, I have hereto affixed my signature in the presence of two witnesses.

THOMAS W. HENDERSON.

Witnesses:
F. C. CHAMBERS,
W. C. YOUNG.